May 8, 1928.
C. H. LE P. JONES
PAPER FINISH TESTER
Filed March 11, 1927
1,668,593
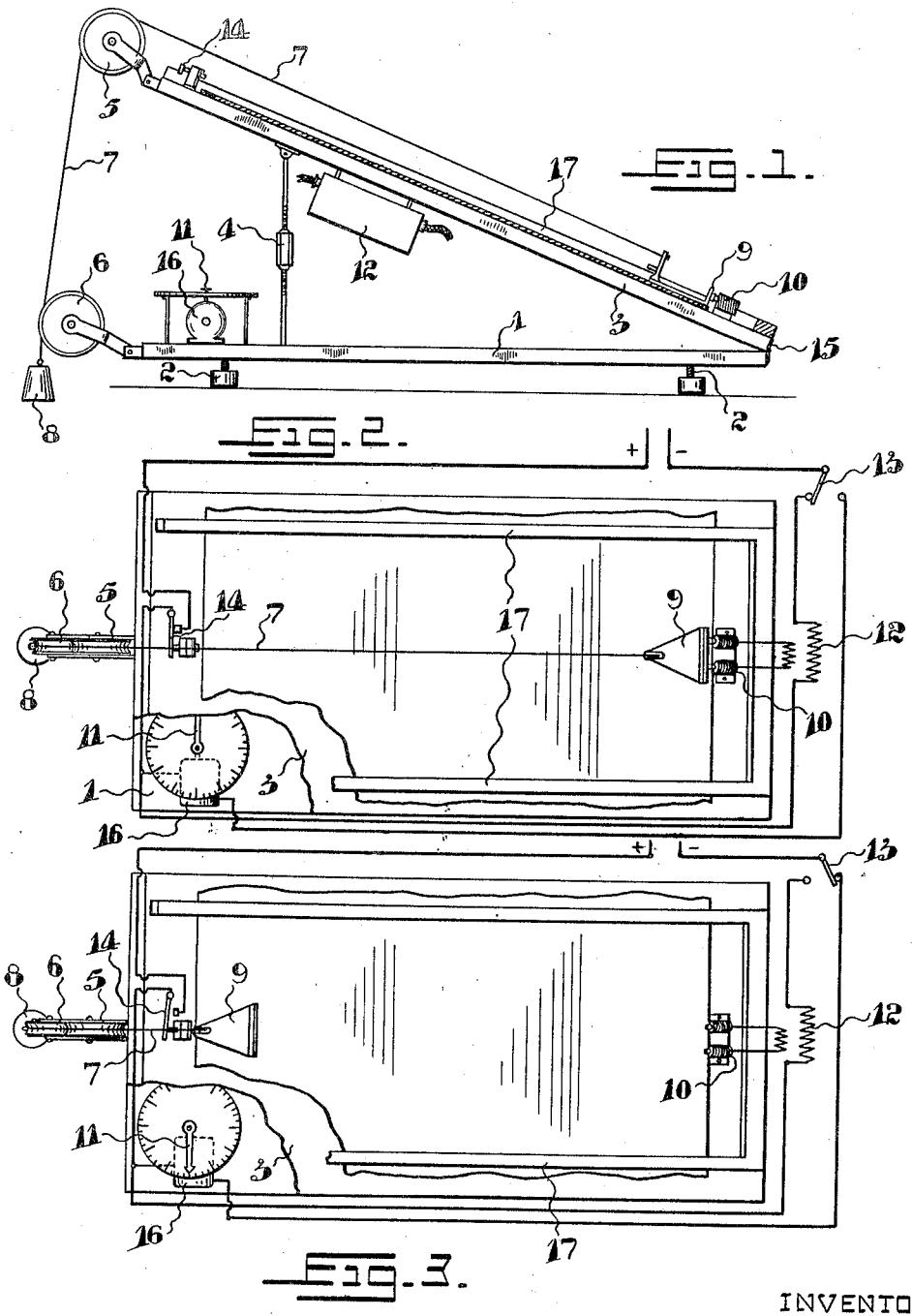
INVENTOR.
C. H. le P. Jones.
BY J. Edward Maybee.
ATTY.

Patented May 8, 1928.

1,668,593

UNITED STATES PATENT OFFICE.

CHARLES H. LE P. JONES, OF SAULT STE. MARIE, ONTARIO, CANADA.

PAPER-FINISH TESTER.

Application filed March 11, 1927. Serial No. 174,624.

In the paper making industry and particularly where a machine or machines are more or less continuously employed in producing a certain grade of paper, such for example as newsprint, it becomes of the utmost importance that a predetermined quality be maintained in the output. To determine whether or not a given sample possesses the desired quality, it is subjected to certain tests to ascertain its characteristics, physical or otherwise, and among these tests is one to ascertain the smoothness of its finish. So far the sense of touch has been relied on to determine whether or no the finish is up to standard or not, but this method is unsatisfactory as no accurate basis of comparison can be established leaving out of account the personal equation. My object therefore is to devise a process and apparatus therefor which will enable an indication to be obtained of the relative smoothness of any number of samples, which indications, by reference to the indication obtained from a satisfactory sample adopted as a standard, will enable the testing operator to determine with great accuracy whether a specimen is, in finish, above or below standard and to what degree.

I attain my object by positioning a sheet of paper on a smooth plane surface and causing a smooth faced drag to be moved over the surface of the paper by the action of a predetermined force, such as gravity, and obtaining an indication of the mean rate of movement. Preferably the drag is always moved a predetermined distance and the indication is of the time occupied by the drag in travelling that distance. In practice it is preferable to incline the surface supporting the sheet of paper and to draw the drag upwardly by the action of a weight overbalancing that of the weight of the drag itself.

The details of the process and of the apparatus by means of which it is carried out are hereinafter more specifically described and are illustrated in the accompanying drawings in which Fig. 1 is a side elevation of the apparatus with the drag in its initial position;

Fig. 2 is a plan view of the same indicating the electrical connections diagrammatically; and Fig. 3 is a similar view showing the drag in its final position.

In the drawings like numerals of reference indicate corresponding parts in the different figures.

The device comprises a base 1, preferably provided with levelling screws 2, whereby it may be adjusted on any suitable support to horizontal position. On this base is hinged at 15 a flat board or table 3. An adjustable support 4 of the nature of a turnbuckle is provided whereby the angle of the table to the base may be adjusted as required. Suitably supported from the table is a sheave 5, while a similar sheave 6 is supported on the base. A cord 7 has a weight 8 secured to one end and is passed over the sheaves and is secured at its other end to a drag 9, which is formed of a wedge shaped weight having a smooth, well polished under surface. Suitable means are provided, such as the clamp bars 17, for securing a sheet of the paper to be tested to the upper surface of the table and in a perfectly flat condition. The drag 9, when the sheet of paper is being tested, is held at the lower end of the table by means of an electro-magnet 10. When the drag is released by de-energizing the electro-magnet, it will under the influence of the counter weight start to move up the sheet of paper, and the rate of its travel will determine the finish of the paper relative to pre-determined standard. To indicate the lapse of time, a motor driven indicator 11 is provided, and means are provided whereby the motor is energized at the same instant the electro-magnet is de-energized, and means are provided for de-energizing the motor the instant the drag arrives at the end of its travel.

While various means may be provided for the above purpose, I show a specific arrangement suitable for the purpose. A transformer 12 is provided adapted to step-down the line current employed to a voltage suitable for the electro-magnet. A switch 13, when moved to the left, closes the circuit of the transformer 12 and thus energizes the electro-magnet 10 and when moved to the right de-energizes the electro-magnet and energizes the motor circuit so that the motor 16, which is preferably a Warren synchronous clock motor, may be started the instant the electro-magnet releases the drag. A contact breaker 14 is provided in the motor circuit adapted to be engaged by the drag when it reaches the end of its travel to break the motor circuit so that the motor, and therefore the indicator, stops at once.

In practice I have found that the best results are obtained if the table 3 be set at an angle of about 27° to the horizontal and if the weight 8 overbalance the drag 9 in the ratio of about 10 to 9. The essential features of the process will, however, be present whether the paper be horizontal or inclined and whether the drag move uphill or downhill provided an accurate indication be obtained in each case, of its average rate of motion over a predetermined distance.

What I claim is:

1. The process of testing the surface finish of a sheet of paper which consists in positioning the paper on a smooth plane surface, moving a drag over the surface of the paper by the application of a predetermined force and obtaining an indication of the mean rate of movement of the drag for comparison with a predetermined standard.

2. The process of testing the surface finish of a sheet of paper which consists in positioning the sheet of paper on a smooth plane surface, moving a drag over the surface of the paper for a predetermined distance by the application of a predetermined force, and obtaining an indication of the time taken by the drag to move said distance for comparison with a predetermined standard.

3. The process of testing the surface finish of a sheet of paper which consists in positioning the sheet of paper on a smooth surface, moving a drag over the surface of the paper for a predetermined distance by a predetermined force and obtaining an indication of the time taken by the drag to move said distance for comparison with an indication obtained under the same conditions with a standard sheet.

4. The process of testing the surface finish of a sheet of paper which consists in positioning the paper on a smooth surface, moving a drag over the surface of the paper for a predetermined distance by a predetermined force and obtaining an indication of the mean rate of movement of the drag for comparison with a predetermined standard.

5. The process of testing the surface finish of a sheet of paper which consists in positioning the sheet of paper on a smooth surface, moving a drag over the surface of the paper for a predetermined distance by a predetermined force and obtaining an indication of the time taken by the drag to move said distance for comparison with a predetermined standard.

6. The process of testing the surface finish of a sheet of paper which consists in positioning the sheet of paper on a smooth plane surface, causing a drag, by the action of gravity, to move a predetermined distance over the surface of the paper and obtaining an indication of the time taken by the drag to move said distance for comparison with an indication obtained under the same conditions with a standard sheet.

7. The process of testing the surface finish of a sheet of paper which consists in positioning the sheet of paper on a smooth plane surface maintained at a predetermined inclination to the horizontal, causing a drag, by the action of gravity, to move a predetermined distance in the direction of inclination over the surface of the paper and obtaining an indication of the time taken by the drag to move said distance for comparison with an indication obtained under the same conditions with a standard sheet.

8. Apparatus for testing the surface finish of paper comprising a table on which a sheet of paper may be secured; a drag adapted to move over the surface of a sheet of paper secured on the table; means for applying a predetermined force to move the drag over the surface of the paper; means adjacent one end of the table for holding the drag stationary against the action of said force; a time indicating mechanism adapted to be stopped and started; means for simultaneously starting the time indicating mechanism and releasing the drag; and means for stopping the time indicating mechanism after the drag has travelled a predetermined distance.

9. Apparatus for testing the surface finish of paper comprising a table on which a sheet of paper may be secured; a drag adapted to move over the surface of a sheet of paper secured on the table; means for applying a predetermined force to move the drag over the surface of the paper; means adjacent one end of the table for holding the drag stationary against the action of said force; a time indicating mechanism adapted to be stopped and started; means for simultaneously starting the time indicating mechanism and releasing the drag; and means, actuable by a part moving with the drag for stopping the time indicating mechanism after the drag has travelled a predetermined distance.

10. Apparatus for testing the surface finish of paper comprising a table inclined to the horizontal on which a sheet of paper may be secured; a drag adapted to move over the surface of a sheet of paper secured on the table; means for applying a predetermined force to move the drag upwardly over the surface of the paper; means adjacent one end of the table for holding the drag stationary against the action of said force; a time indicating mechanism adapted to be stopped and started; means for simultaneously starting the time indicating mechanism and releasing the drag; and means for stopping the time indicating mechanism after the drag has travelled a predetermined distance.

11. Apparatus constructed according to claim 10 in which the means for moving the drag comprises a weight overbalancing the drag, a cord connecting the weight and drag, and a guide pulley over which the cord runs.

12. Apparatus for testing the surface finish of paper comprising a table on which a sheet of paper may be secured; a drag adapted to be moved by a predetermined force over the surface of a sheet of paper secured on the table; means adjacent one end of the table for holding the drag stationary against the action of said force; a time indicating mechanism adapted to be stopped and started; means for simultaneously starting the time indicating mechanism and releasing the drag; and means for stopping the time indicating mechanism after the drag has travelled a predetermined distance.

Signed at Toronto, Canada, this 16th day of February, 1927.

CHARLES H. LE P. JONES.